United States Patent
Dai et al.

(10) Patent No.: US 11,994,771 B1
(45) Date of Patent: May 28, 2024

(54) DRIVE BACKPLATE AND DISPLAY DEVICE

(71) Applicant: TCL China Star Optoelectronics Technology Co., Ltd., Guangdong (CN)

(72) Inventors: Yunfei Dai, Guangdong (CN); Jing Liu, Guangdong (CN); Hongzhao Deng, Guangdong (CN); Linnan Chen, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/193,729

(22) Filed: Mar. 31, 2023

(30) Foreign Application Priority Data

Jan. 30, 2023 (CN) .......................... 202310110345.1

(51) Int. Cl.
*G02F 1/13357* (2006.01)
*G02F 1/1335* (2006.01)

(52) U.S. Cl.
CPC .. *G02F 1/133605* (2013.01); *G02F 1/133607* (2021.01); *G02F 1/133611* (2013.01); *G02F 1/133612* (2021.01); *G02F 1/133528* (2013.01); *G02F 1/133603* (2013.01)

(58) Field of Classification Search
None
See application file for complete search history.

(56) References Cited

U.S. PATENT DOCUMENTS

2020/0379298 A1* 12/2020 Notoshi ............ G02F 1/133603

FOREIGN PATENT DOCUMENTS

| JP | 2002244586 A | * | 8/2002 | ........... G02F 1/1333 |
| KR | 20110084062 A | * | 7/2011 | |

* cited by examiner

*Primary Examiner* — Phu Vu
(74) *Attorney, Agent, or Firm* — Menachem Nathan; Nathan & Associates (57) ABSTRACT

A drive backplate and a display device are provided. The drive backplate includes a substrate, a wiring layer arranged on one side of the substrate, and a reflective layer. The reflective layer and the wiring layer are arranged on the same side of the substrate. The wiring layer includes at least one first type line, and the reflective layer covers the first type line. Each first type line includes at least one first recess, and the reflective layer is partially inside the first recess, so the present application increases a contact area between the reflective layer and the first type line, increases a bonding force between the reflective layer and the wiring layer, reduces a risk of detachment of the reflective layer from the wiring layer, and improves product quality of the display device having the drive backplate.

18 Claims, 5 Drawing Sheets

DRIVE BACKPLATE AND DISPLAY DEVICE

FIELD OF DISCLOSURE

The present disclosure relates to a field of display technology and in particular, to a drive backplate and a display device.

DESCRIPTION OF RELATED ART

Liquid crystal displays (LCD) and organic light emitting displays (OLED) have different working principles. Unlike OLEDs, LCDs require a backlight to emit light. There are mainly two types of backlighting: an edge-lit backlight and a direct-lit backlight. In the edge-lit type, light source light-emitting diodes (LEDs) are placed at lateral sides with respect to a light guide plate. In this case, light has to be evenly distributed to each corner of the backlight by using the light guide plate, which causes inefficient lighting, high energy consumption, poor uniformity, and low brightness. In the direct-lit type, LEDs are uniformly distributed, which achieves more uniform lighting and more efficient lighting. Especially, when the direct-lit backlight uses sub-millimeter light-emitting diodes (Mini-LED) as its light source, a size of an Mini-LED is about one-fortieth of a size of traditional LED, and as a result, an overall light source layout is more precise, and the image quality is greatly improved. Accordingly, Mini-LEDs attract a lot of attention in the industry.

At present, in a drive backplate used in a backlight module of a direct-lit LCD, a reflective layer covers a surface of a substrate to increase a light utilization rate of the backlight module. However, a bonding force between the reflective layer and wiring on the substrate is weak, causing detachment to occur at places where the reflective layer contacts the wiring, thus affecting product quality.

Therefore, there is an urgent need to provide a drive backplate and a display device to solve the above technical problems.

SUMMARY

The present disclosure provides a drive backplate and a display device that can alleviate a technical problem in a conventional drive backplate in a backlight module of a direct-lit LCD, in which a reflective layer is easily detached from wiring.

The present invention provides a drive backplate, including:
  a substrate;
  a wiring layer disposed on one side of the substrate, the wiring layer provided with a plurality of first recesses and including at least one first type line; and
  a reflective layer disposed on the substrate, wherein the reflective layer and the wiring layer are disposed on a same side of the substrate, and the reflective layer covers the first type line;
  wherein the reflective layer is partially disposed in the first recesses.

Preferably, the first recesses are arranged in an array in the first type line or the first recesses are discretely arranged in the first type line.

Preferably, the first recesses are discretely arranged in the first type line, the adjacent first recesses in the first type line are partially staggered from each other in a first direction, and/or the adjacent first recesses in the first type line are partially staggered from each other in a second direction; and wherein the first direction is parallel to an extending direction of the first type line, and the second direction intersects the first direction.

Preferably, the first recesses comprise a plurality of first sub-recesses and/or a plurality of second sub recesses, an extending direction of each of the first sub-recesses is parallel to the first direction, and an extending direction of each of the second sub-recesses is parallel to the second direction.

Preferably, the reflective layer comprises a protruding portion arranged right above the first type line and a flat portion arranged on two sides of the first type line, the protruding portion protrudes in a direction away from the substrate, and one side of the flat portion away from the substrate is parallel to the substrate; and
  wherein a difference between a distance from one side of the protruding portion away from the substrate to the substrate and a distance from one side of the flat portion away from the substrate to the substrate is less than 10 microns.

Preferably, each of the first recesses penetrates through the first type line, the reflective layer comprises a plurality of contact portions disposed in the first recesses, and one side of each of the contact portions close to the substrate contacts the substrate.

Preferably, for the first type line, an area of orthogonal projections of the first recesses projected on the substrate occupies 40% to 60% of an area of an orthogonal projection of the first type line projected on the substrate.

Preferably, in the first type line, a depth of at least one of the first recesses first increases and then decreases in a second direction.

The present invention further provides a display device, comprising a backlight module and a display panel disposed on a light emitting side of the backlight module:
  wherein the backlight module includes the above-mentioned drive backplate and an optical film disposed on a light emitting side of the drive backplate.

In the present invention, the first recess is configured in a manner such that the reflective layer is partially disposed in the first recess. This way, the present invention increases a contact area between the reflective layer and the first type line, improves a bonding force between the reflective layer and the wiring layer, reduces a risk of detachment of the reflective layer from the wiring layer, and improves the product quality of the display device with the drive backplate.

BRIEF DESCRIPTION OF DRAWINGS

In order to more clearly illustrate the technical solutions of the present disclosure, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DETAILED DESCRIPTION OF EMBODIMENTS

The technical solutions of the present invention are clearly and completely described below with reference to the accompanying drawings and in conjunction with specific embodiments. The described embodiments are merely some of the embodiments rather than all of the embodiments of the present invention. All other embodiments obtained by persons of ordinary skill in the art based on the embodiments of the present invention without creative efforts shall fall within the protection scope of the present invention. Moreover, it is to be understood that the specific embodiments described here are only for the purpose of illustration and explanation and are not intended to limit the present invention. In the present invention, directional terms such as "up" and "down" usually refer to the "up" and "down" states in actual use or a working state of the device, and particularly refer to the directions in the accompanying drawings, while "inside" and "outside" are used referred to with respect to the outlines of the device, in the absence of a contrary description.

Currently, a drive backplate used in a backlight module of a direct-lit LCD has a problem that detachment easily occurs at places where the reflective layer contacts wiring due to a weak bonding force between the reflective layer and wiring.

Referring to FIGS. 1 to 4, the present invention provides a drive backplate 110 including:
- a substrate 111;
- a wiring layer 112 disposed on one side of the substrate 111, the wiring layer 112 provided with a plurality of first recesses 114 and including a plurality of first type lines 113; and
- a reflective layer 115, wherein the reflective layer and the wiring layer are disposed on a same side of the substrate 111, and the reflective layer 115 covers the first type lines 113;
- wherein the reflective layer 115 is partially disposed in the first recesses 114.

In the present invention, the first recess 114 is configured such that the reflective layer 115 is partially disposed in the first recesses 114, thereby increasing a contact area between the reflective layer 115 and the first type line 113, increasing a bonding force between the reflective layer 115 and the wiring layer 113, reducing a risk of detachment of the reflective layer 115 from the wiring layer 113, and improving product quality of the display device with the drive backplate 110.

The technical solutions of the present disclosure are described in connection with specific embodiments.

Referring to FIGS. 1 to 4, in the embodiment, a depth of the first recess 114 is less than or equal to a thickness of the first type line 113, which is conducive to increase the contact area between the reflective layer 115 and the first type line 113, thereby increasing a bonding force between the reflective layer 115 and the wiring layer 112, and reducing a risk of detachment of the reflective layer 115 from the wiring layer 112. Furthermore, due to the arrangement of the first recess 114, a slope of the reflective layer 115 on the first type line 113 is gentler and less steep, which makes the reflective layer 115 reflect light more uniformly as a whole. Accordingly, the present invention improves uniformity of the light output of the drive backplate 110 and also improves the product quality of the display device with the drive backplate 110.

The reflective layer 115 includes a contact portion disposed within the first recess 114, the first recess 114 preferably has a depth equal to the thickness of the first type line 113. In this case, the first recess 114 penetrates the first type line 113, the contact portion contacts the substrate 111 and is located on one side close to the substrate 111. A bonding force per unit contact area between the substrate 111 and the reflective layer 115 is greater than a bonding force per unit contact area between the wiring layer 112 and the reflective layer 115. Further, by configuring the first recess 114 to have the depth equal to the thickness of the first type line 113, the contact portion of the reflective layer 115 increases a contact area with the wiring layer 112, and the contact portion of the reflective layer 115 contacts the substrate 111. As a result, it is more difficult to separate the reflective layer 115 from the first type line 113, thus reducing a risk of the detachment of the reflective layer 115 from the wiring layer 112.

In some embodiments, an orthogonal projection of each first recess 114 projected on the substrate 111 can be a square, a rectangle, a diamond, a circle, an oval, or other polygon. The first recesses 114 can be arranged in an array in the first type line 113; or alternatively, the first recesses 114 can be arranged in a non-array manner in the first type line 113 (e.g., the first recesses 114 can be discretely arranged in the first type lines 113). When the first recesses 114 are discretely arranged in the first type lines 113, spacings between at least some of the first recesses 114 are different; or alternatively, areas of the orthogonal projections of at least some of the first recesses 114 projected on the substrate 111 are different. When the first recesses 114 are discretely arranged in the first type lines 113, the adjacent first recesses 114 are at least partially staggered from each other in a first direction, and/or the adjacent first recesses 114 are at least partially staggered from each other in a second direction. The first direction is parallel to an extending direction of the first type line 113, and the second direction intersects the first direction. When the adjacent first recesses 114 are at least partially staggered from each other in the first direction, the first recesses 114 in the first direction may be partially staggered or fully staggered from each other. When the adjacent first recesses 114 are at least partially staggered from each other in the second direction, the adjacent first recesses 114 in the second direction can be partially staggered or fully staggered from each other.

Figure 2:
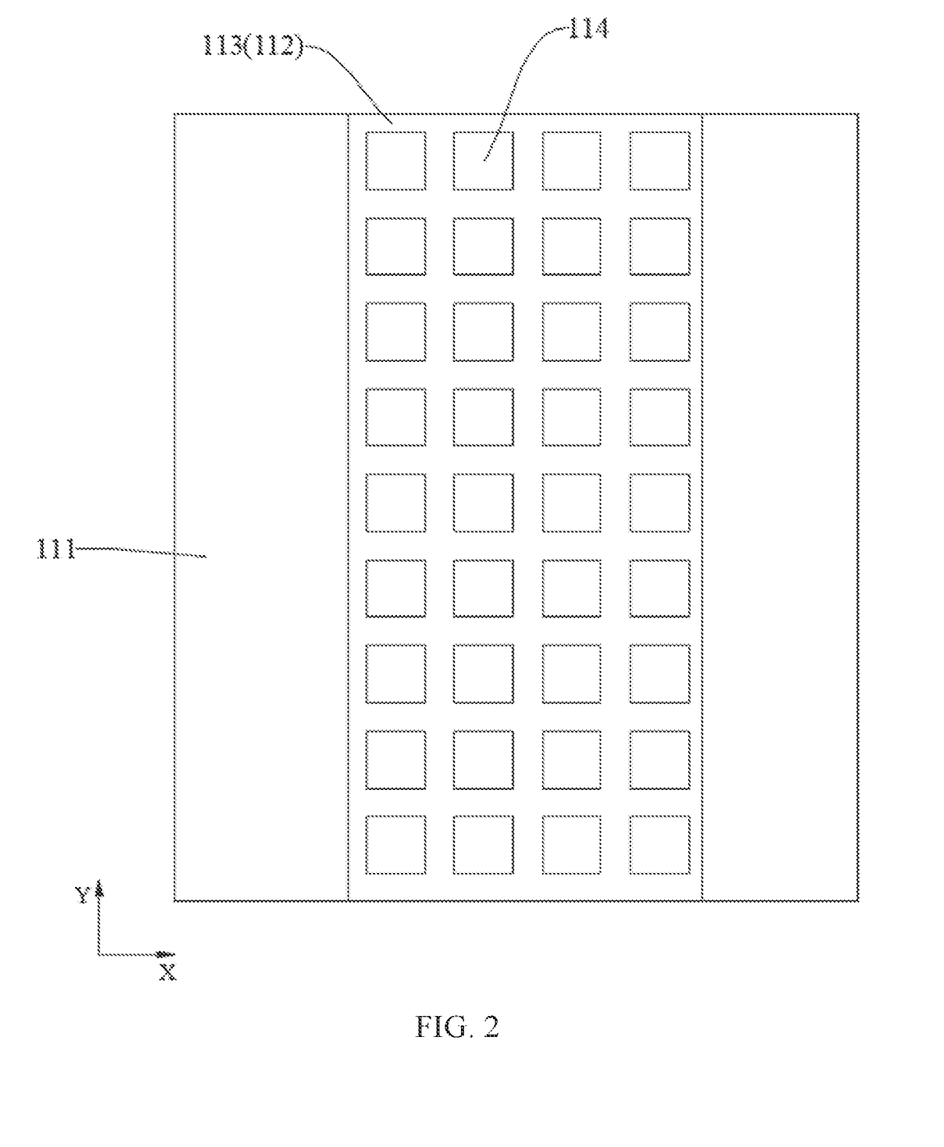
FIG. 2 is a schematic view of a first type line of the drive backplate according to a first embodiment of the present disclosure.

Referring to FIG. 2, in some embodiments, the first recesses 114 are arrayed in an array in the first type line 113, a column direction Y of the first recesses 114 is parallel to the extending direction of the first type line 113, and a row direction X of the first recesses 114 intersects the extending direction of the first type line 113.

The first recesses 114 are arranged in an array in the first type line 113. That is to say, multiple first recesses 114 are arranged successively along the column direction Y, and multiple first recesses 114 are arranged successively along the row direction X. When the column direction Y of the first recesses 114 is parallel to the extending direction of the first type line 113, and the row direction X of the first recesses 114 intersects the extending direction of the first type line 113, there are more first recesses 114 in a same column than the first recesses 114 in a same row.

By arranging the first recesses 114 in an array in the first type line 113, the contact area of the contact portion of the reflective layer 115 with the wiring layer 112 is increased per unit area. Further, when the depth of the first recess 114 is equal to the thickness of the first type line 113, a contact area of the contact portion of the reflective layer 115 in the first recess 114 with the substrate is increased per unit area. As a result, it is more difficult to separate the reflective layer 115 from the first type line 113, thus reducing a risk of detachment of the reflective layer 115 from the wiring layer 112 and improving the product quality of the display device with the drive backplate 110.

In some embodiments, the column direction Y of the first recesses 114 can be perpendicular to the row direction X of the first recesses 114.

In some embodiments, the first type line 113 includes a plurality of first type sub-lines. Extending directions of the adjacent first type sub-lines intersect. The first recesses 114 arranged in an array is divided into a plurality of array groups. One of the array groups is disposed corresponding to one of the first type sub-lines. In each of the array groups, the column direction Y of the first recesses 114 is parallel to the extending direction of the corresponding first type sub-line.

Figure 3:
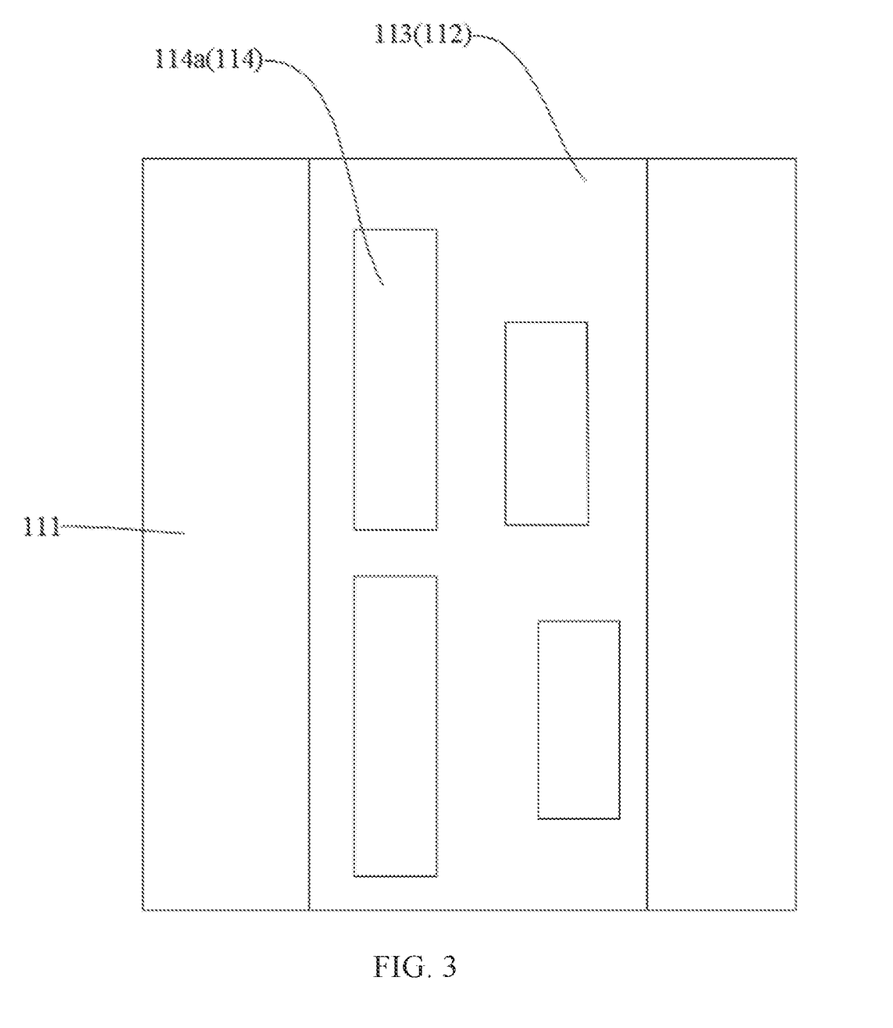
FIG. 3 is a schematic view of the first type line of the drive backplate according to a second embodiment of the present disclosure.

Referring to FIG. 3, in some embodiments, the first recesses 114 comprise at least one first sub-recess 114a, and the first sub-recess 114a extends in the first direction.

The first recess 114 can have multiple sides. For example, the first recess 114 can have a first side opposite to a second side and a third side opposite to a fourth side. Both the third side and the fourth side are connected between the first side and the second side. The third side is disposed at one end of the first side, and the fourth side is disposed at another end of the first side.

An extending direction of an orthogonal projection of the first side of the first sub-recess 114a projected on the substrate 111 and an extending direction of an orthogonal projection of the second side of the first sub-recess 114a projected on the substrate 111 are both parallel to the extending direction of the first type line 113. The extending direction of the first sub-recess 114a is parallel to the extending direction of the first type line 113. That is to say, a length of the orthogonal projection of the first side and/or the second side of the first sub-recess 114a projected on the substrate 111 is greater than a length of an orthogonal projection of the third side and/or the fourth side of the first sub-recess 114a projected on the substrate 111.

In some embodiments, the first recesses 114 include one first sub-recess 114a; or alternatively, the first sub-recesses 114a are discretely arranged in the first type line 113. Specifically, when the first sub-recesses 114a are discretely arranged in the first type line 113, the first sub-recesses 114a are arranged successively along the first direction; or alternatively, the first sub-recesses 114a are discretely arranged in the first type line 113 along the second direction. When the first sub-recesses 114a are arranged successively along the first direction, the adjacent first sub-recesses 114a in the first direction can be staggered with respect to each other; or, when the first sub-recesses 114a are arranged successively along the first direction, the adjacent first sub-recesses 114a in the first direction can be fully staggered from each other; or, when the first sub-recesses 114a are successively arranged along the second direction, the adjacent first sub-recesses 114a in the second direction can be staggered with respect to each other; or, when the first sub-recesses 114a are successively arranged along the second direction, the adjacent first sub-recesses 114a in the second direction can be fully staggered from each other.

In some embodiments, when the first sub-recesses 114a are arranged successively along the first direction, spacings between at least some of the adjacent first sub-recesses 114a can be different in the first direction. When the first sub-recesses 114a are arranged successively along the second direction, spacings between at least some of the adjacent the first sub-recesses 114a can be different in the second direction.

In some embodiments, areas of orthogonal projections of at least some of the first sub-recesses 114a projected on the substrate 111 can be different.

In some embodiments, the first direction can be perpendicular to the second direction.

Figure 4:
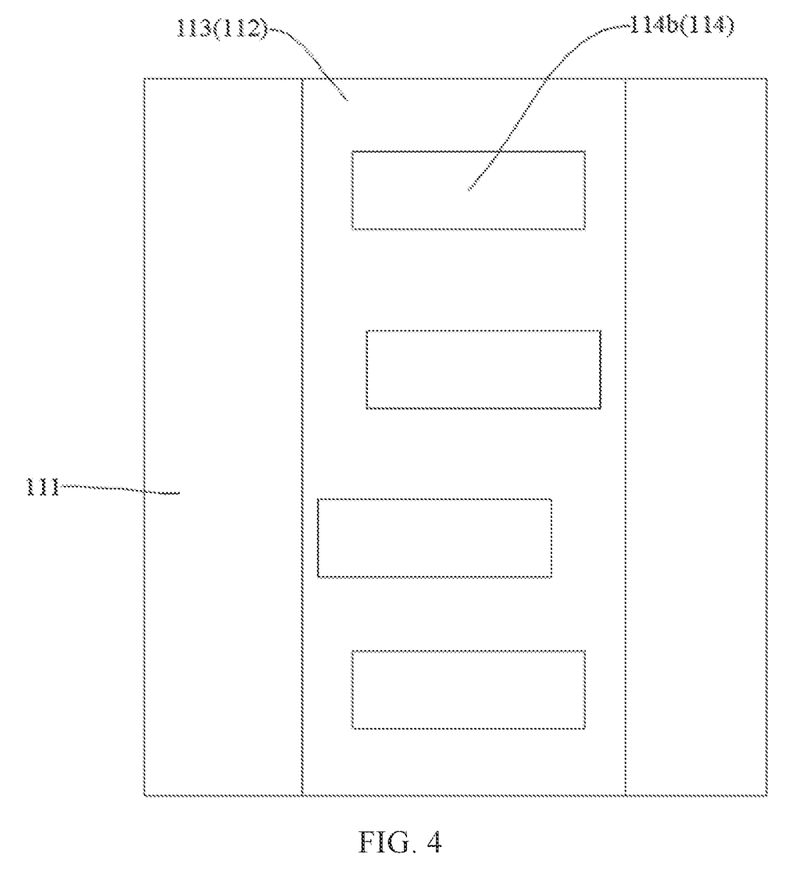
FIG. 4 is a schematic view of the first type line of the drive backplate according to a third embodiment of the present disclosure.

In some embodiments, the first-type line 113 includes a plurality of first-type sub-lines, extending directions of the adjacent first-type lines intersect. The first-type line 113 can include one first sub-recess 114a. An extending direction of the first sub-recess 114a changes with the extending direction of the first type sub-line, so that an extending direction of an orthogonal projection of the first side of the first sub-recess 114a projected on the substrate 111 and an extending direction of an orthogonal projection of the second side of the first sub-recess 114a projected on the substrate 111 are always parallel to the extending direction of the first type line 113. Alternatively, each of the first type sub-lines can include one or more of the first sub-recesses 114a. An extending direction of an orthogonal projection of the first side of the first sub-recess 114a in each of the first type sub-lines projected on the substrate 111 and an extending direction of an orthogonal projection of the second side of the first sub-recess 114a in each of the first type sub-lines are parallel to the extending direction of the first type sub-line where the first sub-recess 114a is located. Referring to FIG. 4, in some embodiments, the first recesses 114 further include a plurality of second sub-recesses 114b arranged successively along the first direction, and each second sub-recess 114b extends along the second direction.

The second sub-recess 114b extends along the second direction. That is to say, a length of an orthogonal projection of the third side and/or the second side of the second sub-recess 114b projected on the substrate 111 is greater than a length of an orthogonal projection of the first side and/or the fourth side of the second sub-recess 114b projected on the substrate 111.

In some embodiments, the second sub-recesses 114b are discretely arranged in the first type line 113. Specifically, when the first recesses 114 include the plurality of second sub-recesses 114b, and when the second sub-recesses 114b are arranged successively along the first direction, the adjacent second sub-recesses 114b are staggered with respect to each other, or the adjacent second sub-recesses 114b are fully staggered from each other, or the adjacent second sub-recesses 114b are arranged sequentially along a direction in which the second sub-recesses 114b are arranged.

In some embodiments, spacings between the adjacent second sub-recesses 114b can be completely the same. Alternatively, the spacings between at least some of the adjacent second sub-recesses 114b can be different.

In some embodiments, areas of orthogonal projections of the second sub-recesses 114b projected on the substrate 111 can be completely the same, or the areas of the orthogonal projections of some of the second sub-recesses 114b projected on the substrate 111 can be different.

Figure 1:
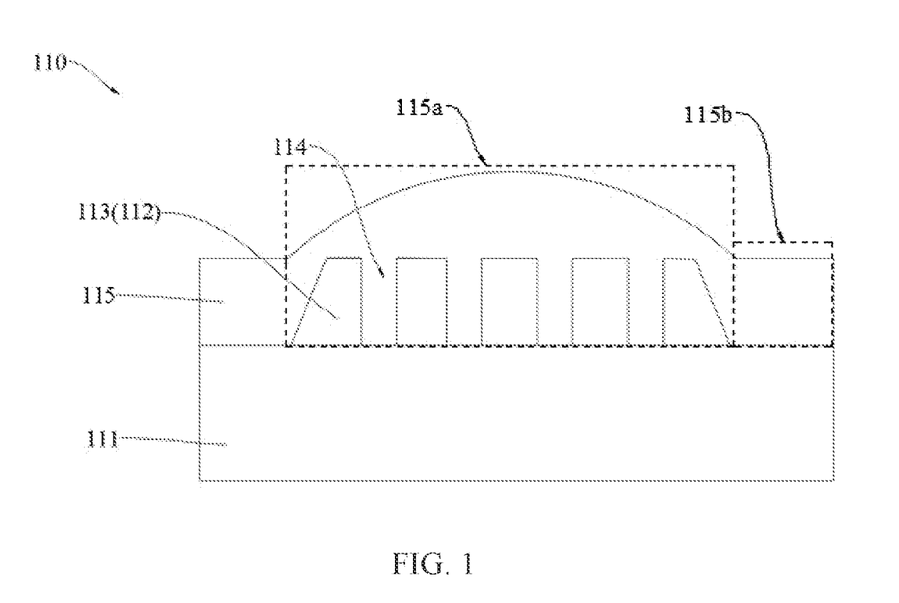
FIG. 1 is a schematic view of a drive backplate according to one embodiment of the present disclosure.

In some embodiments, the reflective layer 115 includes a protruding portion 115a arranged directly above the first type line 113 and a flat portion 115b on both sides of the first type line. The protruding portion 115a protrudes toward a direction away from the substrate 111. One side of the flat portion 115b away from the substrate 111 is parallel to the substrate 111. The protruding portion 115a is located directly above the first type line 113. That is to say, the orthogonal projection of the first type line 113 projected on the substrate 111 overlaps with the orthogonal projection of the protruding portion 115a projected on the substrate 111.

In the second direction, the depth of the at least one first recess 114 first increases and then decreases. By first increasing and then decreasing the depth of the first recess 114 in the second direction, it is beneficial to further planarize the protruding portion 115a of the reflective layer 115 and make a slope of the protruding portion 115a gentler or less steep, so that the reflective layer 115 as a whole reflects light more uniformly, and the uniformity of the light output from the drive backplate 110 improves.

Specifically, when the first recesses 114 are arranged in an array in the first type line 113, the second direction can be parallel to the row direction X of the first recesses 114, and the depths of the first recesses 114 in the same row first increase and then decrease along the row direction X of the first recesses 114. In this case, along the row direction X of the first recesses 114, the first recesses 114 in the same row can be divided into a first depth group and two second depth groups located on two sides of the first depth group. The depths of the first recesses 114 of the first depth group are greater than the depths of the first recesses 114 of the second depth groups. For example, the first recesses 114 of the first depth group extend through the first type line 113, and the depths of the first recesses 114 of the second depth groups are not deep enough to penetrate the first type line 113. In each second depth group, the depths of the first recesses 114 on one side close to the first depth group are greater than the depths of the first recesses 114 on one side away from the first depth group. In a direction toward the first depth group, the depths of the first recesses 114 of each second depth group sequentially gradually increase.

When the first recesses 114 include the plurality of first sub-recesses 114a, and the first sub-recesses 114a are arranged successively along the second direction, the depths of the first sub-recesses 114a first increases and then decreases along the second direction. In this case, the first sub-recesses 114a along the second direction may be divided into a third depth group and two fourth depth groups located on two sides of the third depth group. The depths of the first sub-recesses 114a in the third depth group are greater than the depths of the first sub-recesses 114a in the fourth depth group. In each fourth depth group, the depths of the first sub-recesses 114a on one side close to the third depth group are greater than the depths of the first sub-recesses 114a on one side away from the third depth group. In a direction toward the third depth group, the depths of the first sub-recesses 114a of each fourth depth group gradually increase in sequence.

When the first recesses 114 include one first sub-recess 114a, one side of the first sub-recesses 114a close to the substrate 111 protrudes toward the substrate 111. For example, the side of the first sub-recess 114 a close to the substrate 111 may be an arc surface concave toward the substrate 111. Alternatively, the side of the first sub-recess 114a close to the substrate 111 includes a first central area and a first peripheral area surrounding the first central area. The depth of the first sub-recess 114a in the first central area is greater than the depth of the first sub-recess 114a in the first peripheral area. In a direction toward the first central area, the depth of the first sub-recess 114a in the first peripheral area gradually increases. The depth of the first sub-recess 114a in the first central area can be equal to the thickness of the first type line 113.

When the first recesses 114 includes multiple second sub-recesses 114b, one side of each second sub-recess 114b close to the substrate 111 protrudes toward the substrate 111. For example, the side of the second sub-recess 114b close to the substrate 111 may be an arc surface concave toward the substrate 111. Alternatively, the side of the second sub-recess 114b close to the substrate 111 includes a second central area and a second peripheral area surrounding the second central area. The depth of the second sub-recess 114b in the second central area is greater than the depth of the second sub-recess 114b in the second peripheral area. In a direction toward the second central area, the depth of the second sub-recess 114b in the second peripheral area gradually increases. The depth of the second sub-recess 114b in the second central area can be equal to the thickness of the first type line 113.

In some embodiments, a difference between a distance from one side of the protruding portion 115a away from the substrate 111 to the substrate 111 and a distance from one side of the flat portion 115b away from the substrate 111 to the substrate 111 is less than 10 microns. For example, the difference between the distance from the side of the protruding portion 115a away from the substrate 111 to the substrate 111 and the distance from the side of the flat portion 115b away from the substrate 111 to the substrate 111 can be less than 3 microns, 4 microns, 4.5 microns, 5 microns, 5.5 microns, 6 microns, or 8 microns, etc., which is beneficial to further planarize the protruding portion 115a of the reflective layer 115, and make the slope of the protruding portion 115a gentle and less steep, so that the reflective layer 115 as a whole reflects light more uniformly, and the uniformity of the light output from the drive backplate 110 improves.

In some embodiments, when the depth of the first recess 114 is equal to the thickness of the first type line 113, the thickness of the first type line 113 may decrease first and then increased along the second direction, which is beneficial to further planarize the protruding portion 115a of the reflective layer 115, and make the slope of the protruding portion 115a gentle and less steep, so that the reflective layer 115 as a whole reflects light more uniformly and the uniformity of the light output from the drive backplate 110 improves.

In some embodiments, when the depth of the first recess 114 is equal to the thickness of the first type line 113, the substrate 111 includes a second recess, and an orthogonal projection of the first recess 114 projected on the substrate 111 covers the second recess, which is conducive to increasing the contact area of the side of the contact portion close to the substrate 111 with the substrate 111. As a result, it is more difficult to separate the reflective layer 115 from the first type line 113, thus reducing a risk of detachment of the reflective layer 115 from the wiring layer 112.

In some embodiments, when the depth of the first recess 114 is equal to the thickness of the first type line 113, an area of the orthogonal projections of the first recesses 114 projected on the substrate 111 occupies 40% to 60% of an area of the orthogonal projections of the first type lines 113 projected on the substrate 111. For example: the area of the orthogonal projections of the first recesses 114 projected on the substrate 111 occupies 45%, 48%, 49%, 50%, 51%, 52%, or 55% of the area of the orthogonal projection of the first type line 113 on the substrate 111. This way, the present invention can reduce a risk of detachment of the reflective layer 115 from the wiring layer 112 and make the slope of the protruding portion 115a of the reflective layer 115 gentle and less steep. In addition to that, a resistance of the first type line 113 is prevented from being too high, so the drive backplate 110 generates less heat, and product quality of products having the drive backplate 110 improves.

In the above embodiment, driving methods for the drive backplate 110 include active matrix (AM), passive matrix (PM), active matrix micro integrated circuit chip (AM Micro IC). The active matrix is also called active addressing or active driving, etc. The passive matrix is also called passive addressing or passive driving, etc. A size of the drive backplate 110 includes, but not limited to, 24 inches, 27 inches, 65 inches, and so on.

The substrate 111 can be a glass substrate, a PCB substrate, or a BT substrate, etc. When the substrate 111 is a glass substrate, a thickness of the glass substrate can be, but not limited to, 0.4 mm, 0.5 mm, or 0.7 mm.

In the above embodiments, a width of the first type line 113 can be 0.05 mm to 10 mm, and the thickness of the first type line 113 can be 0.5 micron to 8 micron. The first type line 113 is preferably a wire with a wider width and a thicker thickness. For example, the first type line 113 can be a GND line (ground line) or a VCC line (driver chip power line). The wiring layer 112 can further include a second type line. The second type lines may be lines different from the first type lines 113. The lines in the wiring layer 112 are made of conductive materials, including but not limited to gold, silver, copper, aluminum, and the like. The ways of forming the lines in the wiring layer 112 include, but not limited to, electroplating, screen printing, vapor deposition, and the like.

In the above embodiments, a material of the reflective layer 115 can be white ink or other white reflective material. A thickness of the reflective layer 115 can be 40 microns to 70 microns. When the reflective layer 115 is made of white ink, the white ink can be exposure-type white ink or non-exposure type white ink. The reflective layer 115 can be formed by screen printing or steel screen printing.

In the above embodiments, in the case where the reflective layer 115 is made of white ink, and the depth of the first recess 114 is equal to the thickness of the first type line 113, warpage of the white ink is less than 1 mm, less than 0.8 mm, or less than or equal to 0.7 mm respectively (the degree of warpage of the white ink in the drive backplate without the first recess is greater than 1 mm) when the area of the orthogonal projections of the first recesses 114 projected on the substrate 111 occupies 40%, 50%, and 60% of the area of the orthogonal projections of the first type lines 113 projected on the substrate 111. Further, when the white ink is bonded with an adhesive tape to test the adhesion, there was no paint loss (the white ink in the drive backplate without the first recess had paint losses in the same adhesion test), and reflectivity of the white ink to light is greater than 90%, and deviation of the chromaticity of the light output from the drive backplate is less than 0.01 (deviation of the chromaticity of the light output from the drive backplate without the first recess is greater than 0.01).

In the above embodiment, the drive backplate 110 further includes alight-emitting device located on one side of the reflective layer 115 away from the substrate 111, and the light-emitting device can be LEDs, Micro-LEDs (micro light-emitting diode), or Mini-LEDs.

In the drive backplate 110 of the present invention, the first recess 114 is configured such that the reflective layer 115 is partially located in the first recess 114, thereby increasing the contact area of the reflective layer 115 with the first type line 113, improving the bonding force between the reflective layer 115 and the wiring layer 112, reducing a risk of detachment of the reflective layer 115 from the wiring layer 112, and improving the product quality of the display device with the drive backplate 110.

Figure 5:
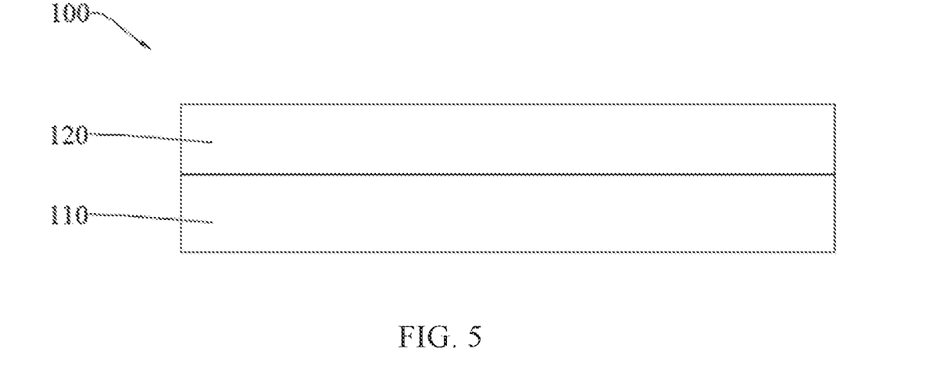
FIG. 5 is a schematic view of a backlight module of a display device according to one embodiment of the present disclosure.
Figure 6:
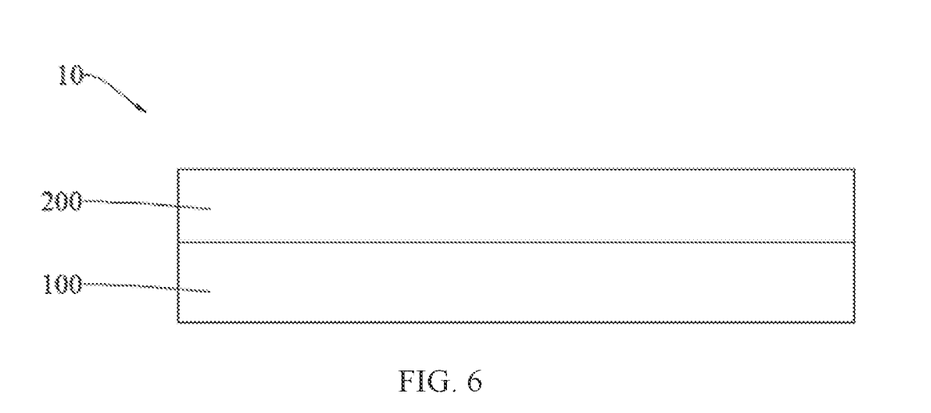
FIG. 6 is a schematic view of the display device according to one embodiment of the present disclosure.

Referring to FIG. 5 and FIG. 6, the present invention further provides a display device 10, including: a backlight module 100 and a display panel 200 located on a light emitting side of the backlight module 100.

Please refer to FIG. 5. The backlight module includes the aforementioned drive backplate 110 and an optical film 120 disposed on a light emitting side of the drive backplate 110.

For structural details of the drive backplate 110, please refer to the above-mentioned embodiments and the accompanying drawings of the drive backplate, and details are not repeated for brevity.

In some embodiments, the optical film 120 includes a diffusion plate, and the diffusion plate is used to convert a light source from the drive backplate 110 into a surface light source. The optical film 120 also includes a prism sheet on one side of the diffusion plate away from the drive backplate 110. The prism sheet is used to converge the light incident on the prism sheet to improve the front brightness. The optical film 120 also includes a brightness-enhancing film on one side of the prism sheet away from the drive backplate 110. The brightness-enhancing film is used to improve the utilization rate of light emitted by the backlight module to the drive backplate 110. In some embodiments, the optical film 120 further includes a diffusion sheet disposed between the diffusion plate and the prism sheet, and the diffusion sheet is used to further scatter the light incident on the diffusion sheet so as to make the light emitted from the diffusion sheet more uniform.

The display panel 200 can be a liquid crystal display panel, and the display panel 200 includes an array substrate and a color filter substrate arranged opposite to each other. The display panel 200 also includes a liquid crystal layer disposed between the array substrate and the color filter substrate. The display panel 200 also includes a first polarizer located on one side of the display panel 200 close to the backlight module 100, and includes a second polarizer located on one side of the display panel 200 away from the backlight module 100.

In the display device 10 of the present application, the drive backplate 110 of the backlight module is provided with the first recess 114 in a manner such that the reflective layer 115 is partially disposed in the first recess 114, thereby increasing a contact area between the reflective layer 115 and the first type line 113, increasing the bonding force between the reflective layer 115 and the wiring layer 112, reducing a risk of detachment between the reflective layer 115 and the wiring layer 112, and improving the product quality of the display device with drive backplate 110.

The present disclosure provides a drive backplate and a display device. The drive backplate includes a substrate, a wiring layer disposed on one side of the substrate, and a reflective layer disposed on a same side of the substrate as the wiring layer. The wiring layer includes at least one first type line, and the reflective layer covers the at least one first type line. The first type line includes at least one first recess, and the reflective layer is partially disposed in the first recess. The present disclosure increases a contact area between the reflective layer and the first type line by having the first recess. The reflective layer is partially disposed in the first recess, a bonding force between the reflective layer and the wiring layer increases, a risk of detachment of the reflective layer from the wiring layer is reduced, and the product quality of the display device with the drive backplate improves.

A drive backplate and a display device provided by the present invention are described above in detail. In the present disclosure, specific examples are used to illustrate the working principles and embodiments of the present invention. The descriptions of the above embodiments are only used for ease of understanding the method and main ideas of the present invention. According to the ideas of the present invention, those skilled in the art can modify or change the embodiments and the application range. In summary, the present invention should not be limited by the content of this specification.

What is claimed is:

1. A drive backplate, comprising:
   a substrate;
   a wiring layer disposed on one side of the substrate, the wiring layer provided with a plurality of first recesses and comprising at least one first type line; and
   a reflective layer disposed on the substrate, wherein the reflective layer and the wiring layer are disposed on a same side of the substrate, and the reflective layer covers the first type line;
   wherein the reflective layer is partially disposed in the first recesses,
   wherein the reflective layer comprises a protruding portion arranged right above the first type line and a flat portion arranged on two sides of the first type line, the protruding portion protrudes in a direction away from the substrate, one side of the flat portion away from the substrate is parallel to the substrate, and an orthogonal projection of the first type line projected on the substrate overlaps with an orthogonal projection of the protruding portion projected on the substrate, and
   wherein in the first type line, each of the first recesses has a depth, and the depths of the first recesses increase and then decrease in a second direction in a manner such that a height difference of the protruding portion from the substrate is reduced to smooth a top surface of the protruding portion.

2. The drive backplate according to claim 1, wherein the first recesses are arranged in an array in the first type line or the first recesses are discretely arranged in the first type line.

3. The drive backplate according to claim 2, wherein when the first recesses are arranged in an array in the first type line, a column direction of the first recesses is parallel to an extending direction of the first type line, and a row direction of the first recesses intersects the extending direction of the first type line.

4. The drive backplate according to claim 2, wherein when the first recesses are discretely arranged in the first type line, the adjacent first recesses in the first type line are partially staggered from each other in a first direction, and/or the adjacent first recesses in the first type line are partially staggered from each other in a second direction; and
   wherein the first direction is parallel to an extending direction of the first type line, and the second direction intersects the first direction.

5. The drive backplate according to claim 4, wherein the first recesses comprise a plurality of first sub-recesses and/or a plurality of second sub recesses, an extending direction of each of the first sub-recesses is parallel to the first direction, and an extending direction of each of the second sub-recesses is parallel to the second direction.

6. The drive backplate according to claim 1,
   wherein a difference between a distance from one side of the protruding portion away from the substrate to the substrate and a distance from one side of the flat portion away from the substrate to the substrate is less than 10 microns.

7. The drive backplate according to claim 1, wherein each of the first recesses penetrates through the first type line, the reflective layer comprises a plurality of contact portions disposed in the first recesses, and one side of each of the contact portions close to the substrate contacts the substrate.

8. The drive backplate according to claim 7, wherein for the first type line, an area of orthogonal projections of the first recesses projected on the substrate occupies 40% to 60% of an area of an orthogonal projection of the first type line projected on the substrate.

9. A display device, comprising:
   a backlight module and a display panel disposed on a light emitting side of the backlight module, wherein the backlight module comprises a drive backplate and an optical film disposed on a light emitting side of the drive backplate, and the drive backplate comprises:
   a substrate;
   a wiring layer disposed on one side of the substrate, the wiring layer provided with a plurality of first recesses and comprising at least one first type line; and
   a reflective layer disposed on the substrate, wherein the reflective layer and the wiring layer are disposed on a same side of the substrate, and the reflective layer covers the first type line;
   wherein the reflective layer is partially disposed in the first recesses,
   wherein the reflective layer comprises a protruding portion arranged right above the first type line and a flat portion arranged on two sides of the first type line, the protruding portion protrudes in a direction away from the substrate, one side of the flat portion away from the substrate is parallel to the substrate, and an orthogonal projection of the first type line projected on the substrate overlaps with an orthogonal projection of the protruding portion projected on the substrate, and
   wherein in the first type line, each of the first recesses has a depth, and the depths of the first recesses increase and then decrease in a second direction in a manner such that a height difference of the protruding portion from the substrate is reduced to smooth a top surface of the protruding portion.

10. The display device according to claim 9, wherein the first recesses are arranged in an array in the first type line or the first recesses are discretely arranged in the first type line.

11. The display device according to claim 10, wherein when the first recesses are arranged in an array in the first type line, a column direction of the first recesses is parallel to an extending direction of the first type line, and a row direction of the first recesses intersects the extending direction of the first type line.

12. The display device according to claim 10, wherein when the first recesses are discretely arranged in the first type line, the adjacent first recesses in the first type line are partially staggered from each other in a first direction, and/or the adjacent first recesses in the first type line are partially staggered from each other in a second direction; and
   wherein the first direction is parallel to an extending direction of the first type line, and the second direction intersects the first direction.

13. The display device according to claim 12, wherein the first recesses comprise a plurality of first sub-recesses and/or a plurality of second sub recesses, an extending direction of each of the first sub-recesses is parallel to the first direction, and an extending direction of each of the second sub-recesses is parallel to the second direction.

14. The display device according to claim 9,
wherein a difference between a distance from one side of the protruding portion away from the substrate to the substrate and a distance from one side of the flat portion away from the substrate to the substrate is less than 10 microns.

15. The display device according to claim 9, wherein each of the first recesses penetrates through the first type line, the reflective layer comprises a plurality of contact portions disposed in the first recesses, and one side of each of the contact portions close to the substrate contacts the substrate.

16. The display device according to claim 15, wherein for the first type line, an area of orthogonal projections of the first recesses projected on the substrate occupies 40% to 60% of an area of an orthogonal projection of the first type line projected on the substrate.

17. The display device according to claim 9, wherein the optical film comprises a diffusion plate, a prism sheet disposed on one side of the diffusion plate away from the drive backplate, a brightness-enhancing film disposed on one side of the prism sheet away from the drive backplate, and a diffusion sheet disposed between the diffusion plate and the prism sheet.

18. The display device according to claim 9, further comprising:
an array substrate and a color filter substrate disposed opposite to each other;
a liquid crystal layer disposed between the array substrate and the color filter substrate; and
a first polarizer disposed on one side of the display panel close to the backlight module, and a second polarizer disposed on one side of the display panel away from the backlight module.

* * * * *